(12) United States Patent
Mariani

(10) Patent No.: US 11,594,966 B2
(45) Date of Patent: Feb. 28, 2023

(54) LOAD DRIVING DEVICE WITH FAILURE DETECTION

(71) Applicant: STMicroelectronics S.r.l., Agrate Brianza (IT)

(72) Inventor: Adalberto Mariani, Garlasco (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/216,263

(22) Filed: Mar. 29, 2021

(65) Prior Publication Data

US 2021/0313887 A1 Oct. 7, 2021

(30) Foreign Application Priority Data

Apr. 1, 2020 (IT) .................... 102020000006871

(51) Int. Cl.
*H02M 3/158* (2006.01)
(52) U.S. Cl.
CPC .................... *H02M 3/158* (2013.01)
(58) Field of Classification Search
CPC .... H02M 3/158; H02M 3/156; H02M 3/1566; H02M 1/0003
See application file for complete search history.

(56) References Cited

U.S. PATENT DOCUMENTS

| 9,966,832 | B1* | 5/2018 | Engelhardt | ............ | H03K 5/135 |
| 2004/0032242 | A1* | 2/2004 | Corva | .................. | H02M 3/156 |
| | | | | | 323/284 |
| 2008/0088292 | A1 | 4/2008 | Stoichita et al. | | |
| 2009/0160414 | A1* | 6/2009 | Hachiya | ................. | H02M 3/156 |
| | | | | | 323/283 |
| 2011/0148372 | A1* | 6/2011 | Mariani | ................... | H03K 7/08 |
| | | | | | 323/272 |
| 2012/0268088 | A1 | 10/2012 | Lee et al. | | |
| 2015/0326102 | A1 | 11/2015 | Radhakrishnan et al. | | |
| 2019/0020275 | A1* | 1/2019 | Childs | ..................... | H02M 1/08 |

FOREIGN PATENT DOCUMENTS

EP 2 337 202 A1 6/2011
EP 2 424 097 A2 2/2012

* cited by examiner

*Primary Examiner* — Alex Torres-Rivera
(74) *Attorney, Agent, or Firm* — Seed Intellectual Property Law Group LLP

(57) ABSTRACT

A converter circuit includes a half-bridge power circuit with a first and a second switch between an input node and a current node and between the current node ground, respectively. An inductor is coupled between the current node and an output node. Logic control circuitry is configured to switch the first and second switches to a current recirculation state and to a current charge state. The logic circuitry is configured to switch the switches from the current recirculation state to the current charge state as a result of a voltage indicator signal from an output voltage comparator being asserted while starting an on-time counter signal having an expiration value, and from the current charge state to the current recirculation state as a result of the on-time counter signal having reached its expiration value in combination with the voltage indicator signal from the voltage comparator being de-asserted.

20 Claims, 2 Drawing Sheets

LOAD DRIVING DEVICE WITH FAILURE DETECTION

BACKGROUND

Technical Field

The description relates to converter circuits. One or more embodiments can be applied in a wide range of devices such as, for instance, wireless battery chargers, USB controllers or lithium-ion (Li-ion) battery supplied devices.

Description of the Related Art

Converter circuits such as so-called "buck" DC-DC power converters are extensively used for power conversion in many applications.

Buck DC-DC converters with constant "on" time (on-time) are widely used due to high responsiveness, reliability and simple design.

These converters are exemplary of conventional converter circuits where factors such as the highest duty-cycle and inductor charging slew rate may be limited by a minimum "off" time (off-time).

Such conventional converter circuits may contemplate various mode of operation, such as a (synchronous) peak current mode, voltage mode (PWM) or hysteretic controller operation.

In a peak current mode, an on-time is started by an internal clock and is stopped when the current through the converter inductor reaches a current threshold.

In a voltage mode, an on-time is started by an internal clock and is stopped when the duty-cycle reaches a duty-cycle threshold.

In hysteretic controller operation, an on-time is started when the output voltage is below a first threshold and stopped when the output is above a second threshold, different from the first threshold.

As known in the art, the duty-cycle DC of a pulsed signal such as a PWM-modulated signal (PWM being an acronym for pulse-width-modulation) denotes the ratio between the duration of the time the signal is active or non-zero (on-time or $t_{ON}$) and the period of the pulsed signal, namely the sum of the duration of the time $t_{ON}$ the signal is active or non-zero and the duration of the time the signal is inactive or zero (off-time o $t_{OFF}$), namely:

$$DC = t_{ON}/(t_{ON}+t_{OFF}).$$

It is noted that conventional solutions as discussed previously may be fairly complex.

For instance, peak current mode operation may require slope compensation, an error amplifier or an error summing comparator.

Voltage mode operation may require a zero-pole compensation network.

A slower transient response may result due to synchronous operation.

Also, hysteretic controller operation may exhibit a poor steady state PWM frequency behavior with changes in the input and output voltages.

BRIEF SUMMARY

The present disclosure provides various embodiments which contribute in overcoming the drawbacks outlined in the foregoing.

According to one or more embodiments, technical benefits and advantages can be achieved by means of a converter circuit having the features set forth as described herein.

One or more embodiments may relate to a corresponding device. Devices as listed at the outset of the present description may be exemplary of such a device.

One or more embodiments may relate to a corresponding method.

The claims are an integral part of the technical teaching on embodiments as provided herein.

One or more embodiments may provide a low drop-out, constant on-time buck converter, where the on-time is extended beyond the duration set by an internal timer as a result of the output voltage being found to be lower than a reference.

One or more embodiments may thus be substantially exempt from limitations in terms to maximum duty cycle due to a minimum off-time being set. This facilitates low drop-out operation, while also improving the inductor current slew rate during transients.

As known to those of skill in the art, the designation low-dropout or LDO regulator applies to DC regulators capable of maintaining regulation with small differences between the input (supply) voltage and the output (load) voltage, that is regulators able to regulate the output voltage even when the input voltage is very close to the output voltage.

One or more embodiments may comprise a peak current comparator to facilitate limiting inductor current during the on-time.

One or more embodiments may provide a low drop-out, constant on-time buck converter offering one or more of the following advantages:

low drop-out operation and improved current slew rate;
wide output range with enhanced transient response;
input voltage range overlapping with output voltage range;
facilitated load booster operation;
increased on-time in the presence of an output voltage below target; and constant on-time control loop.

In one or more embodiments, constant on-time operation can be detected by evaluating switching node waveform, while low drop-out operation may be made manifest by input and output voltages, transient response boost can be evaluated via inductor current.

BRIEF DESCRIPTION OF THE SEVERAL VIEWS OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The headings/references used herein are provided merely for convenience and hence do not define the extent of protection or the scope of the embodiments.

Figure 1:
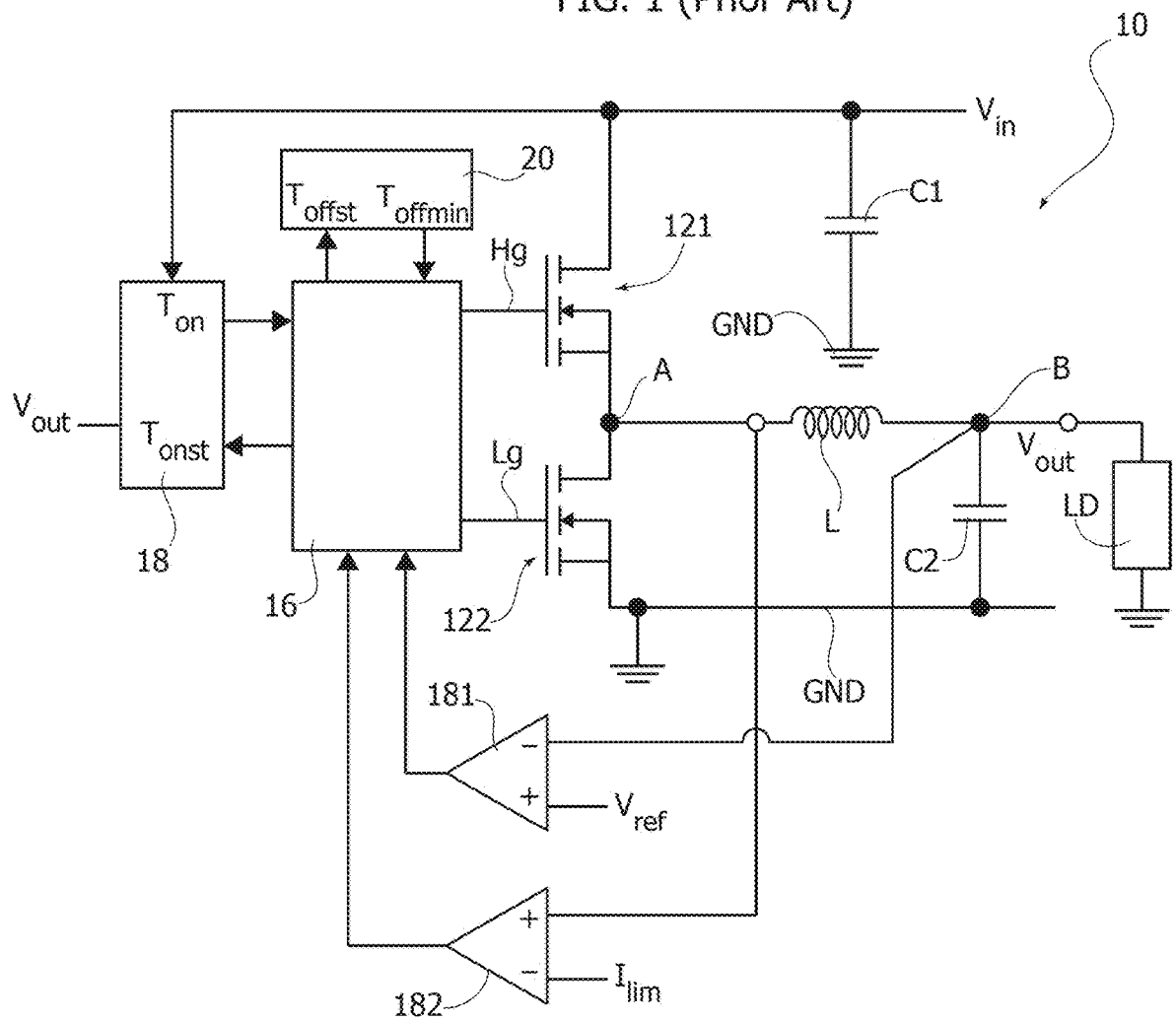
FIG. 1 is a circuit diagram of a conventional constant on-time controller.

FIG. 1 is a circuit diagram of a conventional constant on-time buck controller (converter) 10 comprising a high-side (HS) electronic switch 121 and a low-side (LS) electronic switch 122.

As illustrated, these switches may comprise power mosfet transistors having the current paths therethrough (source-drain current paths, in the case of field-effect transistors such as mosfet transistors) cascaded to each other and providing a first current flow line from an input voltage line or node at a voltage Vin and a node A and a second current flow line between the node A and ground GND.

As illustrated, the voltage Vin may be applied across a first (input) capacitor C1 coupled to the input voltage line Vin and referred to ground GND.

In that respect it will be appreciated that, throughout this description, a same designation may be applied for simplicity to a certain node or line as well as to a signal appearing/applied at the node or line.

As illustrated in FIG. 1:
- the current paths through the transistors 121, 122 are coupled at the node A intermediate the transistors 121, 122 with an inductor L coupled between the node A and an output node B; and
- an output voltage Vout is provided at the output node B across a second (output) capacitor C2 coupled between the output voltage node Vout (node B) and ground GND, with the inductor L located intermediate the nodes A and B.

As illustrated in FIG. 1, a load LD may be coupled to the output node Vout. It will be appreciated that the load LD may be a distinct element from the converter 10.

As illustrated in FIG. 1, switching of the switches 121 and 122 between an on state (switch conductive) and an off state (switch non-conductive) is controlled by a control logic circuit 16 coupled to the control terminals Hg, Lg (gates, in the case of field-effect transistors such as mosfet transistors) of the high-side and low-side switches 121, 122.

As illustrated in FIG. 1, the control logic circuit 16 is sensitive to the output signals from a voltage comparator 181 and a current comparator 182.

As illustrated in FIG. 1:
- the voltage comparator 181 is configured to compare the output voltage Vout sensed at node B (namely across the output capacitor C2) with a voltage reference, Vref, thus acting as an output (PWM) comparator, whose output signal is asserted to a certain level ("1", for instance) as a result of the output voltage Vout being below Vref; and
- the current comparator 182 is configured to compare the intensity of the current through the inductor L with a current reference Ilim thus acting as a valley current limit (VCL) comparator whose output signal is asserted to a certain level ("1", for instance) as a result of the current intensity through the inductor L being higher than a valley (limit) reference value Ilim.

The reference voltage Vref can be obtained in various ways known to those of skill in the art, for instance as the output of a compensation network, an integration network or an error amplifier.

Also, the current through the inductor L can be sensed in various ways known to those of skill in the art, for instance via an amperometric sensor, such as a shunt resistor at node A or node B, or by sensing the voltage across the low-side switch 122 when turned on.

It will be otherwise appreciated that the way of obtaining the reference voltage Vref and/or the way of sensing the intensity of the current through the inductor L may not be of specific momentum for the description of the converters 10 discussed herein.

As illustrated in FIG. 1, the control logic circuit 16 is configured to co-operate with:
- an on-time delay circuit 18, which may be sensitive to the input voltage Vin and the output voltage Vout; and
- a minimum off-time delay circuit 20.

While illustrated as distinct elements for ease of explanation, the on-time circuit 18 and/or the minimum off-time circuit 20 may in fact be incorporated to a common circuitry with control logic circuit 16.

As illustrated in FIG. 1, the control logic circuit 16 is configured to:
- send to the on-time delay circuit 18 a on-time start signal Tonst and receive therefrom a signal Ton, which is a time-delayed replica of Tonst: for instance, when Tonst rises, Ton rises after a certain on-time delay; and
- send to the minimum off-time delay circuit 20 a off-time start signal Toffst and receive therefrom a signal Toffmin, which is a time-delayed replica of Toffst: for instance, when Toffst rises, Toffmin rises after a (minimum) off-time delay.

These signals can be generated in a manner known to those of skill in the art.

As illustrated, the on-timer 18 may be sensitive to the input voltage Vin and the output voltage Vout and may include a feedforward circuit of an analog (RC) type, for instance, capable of providing an on-time signal Ton which is a function (e.g., proportional) of the ratio Vout/Vin, e.g., Ton=(Vout/Vin)·R·C. Digital on-timers are also conventional in the art.

Having an off-time of a minimum duration as provided at 20 is advantageous in stabilizing control, masking signals when possibly exposed to noise induced by switching of the power switches 121, 122.

Figure 2:
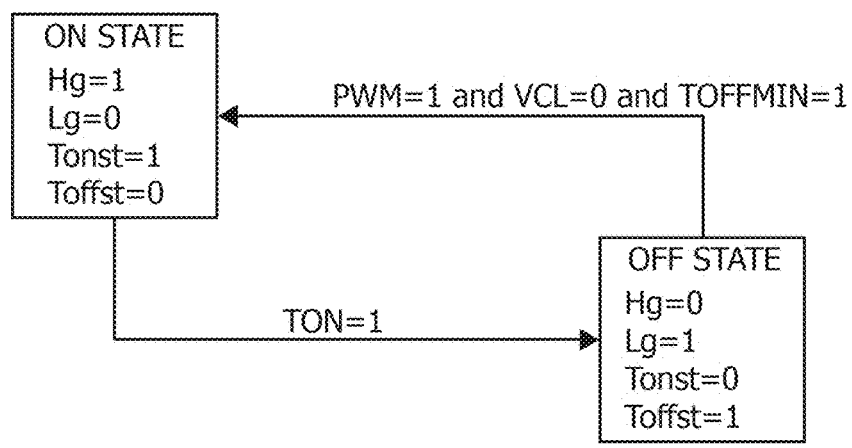
FIG. 2 is a block diagram exemplary of the behavior of a corresponding control logic circuit.

As illustrated in FIG. 2, operation of the control logic circuit 16 of FIG. 1 in driving the control terminals (gates Hg and Lg, in the case of field-effect transistors such as mosfet transistors) of the high-side and low-side switches 121, 122 may involve finite state machine (FSM) operation involving transitioning between an OFF STATE and an ON STATE based on the criteria discussed in the following.

During an OFF STATE, Lg=1, Hg=0—that is, the high-side switch 121 is non-conductive and the low-side switch 122 conductive—the current through the inductor L recirculates through the low-side switch 122 which is conductive.

The minimum off-time delay circuit 20 is started as a result of Toffst being set, e.g., Toffst=1.

After the minimum off-time delay is asserted (TOFFMIN=1) by the circuit 20, if the current through the inductor L is lower than Ilim (VCL=0), the system waits for a PWM comparator trip (comparator 181).

When the output voltage Vout falls below Vref, the PWM comparator 181 trips (PWM=1) and the system enters an ON STATE (see the transition indicated as PWM=1 and VCL=0 and TOFFMIN=1 in FIG. 2).

During the ON STATE, Lg=0, Hg=1—that is, the high-side switch 121 is conductive and the low-side switch 122 non-conductive—and current is charged (pumped) into the inductor L.

The on-time time delay circuit 18 is started as a result of Tonst being set, e.g., Tonst=1. After the expiry of a certain on-time time count, the circuit 18 asserts the Ton signal (TON=1) and the system (re)enters an OFF_STATE (see the transition indicated as TON=1 in FIG. 2).

A converter as described previously and the related mode of operation are conventional in the art, which makes it unnecessary to provide a more detailed description herein.

Also, with the exception of what will be discussed in the following, the description previously provided in connection with FIGS. 1 and 2 also applies to one or more embodiments as exemplified in connection with FIGS. 3 and 4.

Consequently, parts or elements like parts or elements already discussed in connection with FIGS. 1 and 2 are indicated with like reference symbols in FIGS. 3 and 4 and a corresponding description will not be repeated for brevity.

Figure 3:
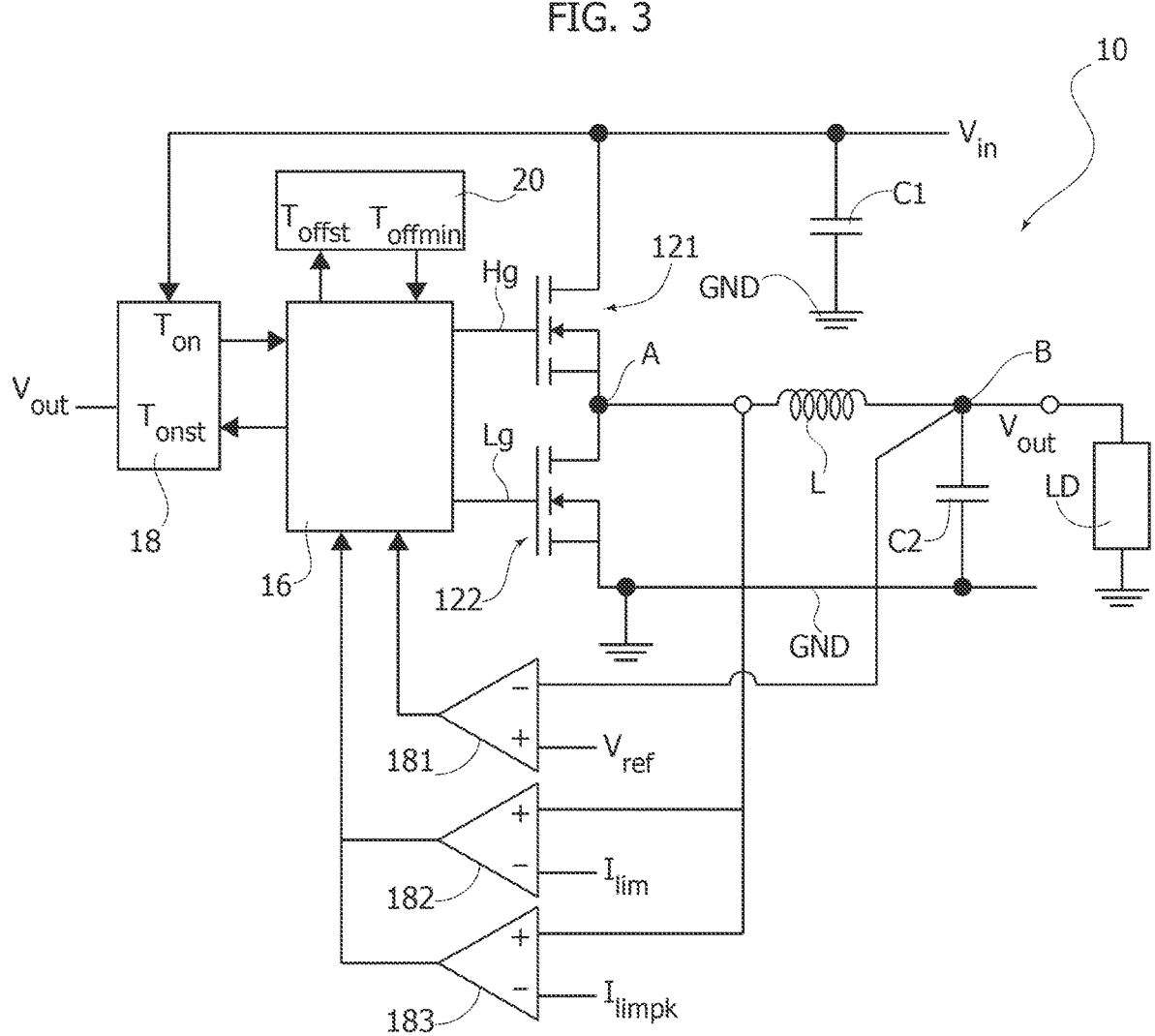
FIG. 3 is a circuit diagram exemplary of embodiments as per the present description.
Figure 4:
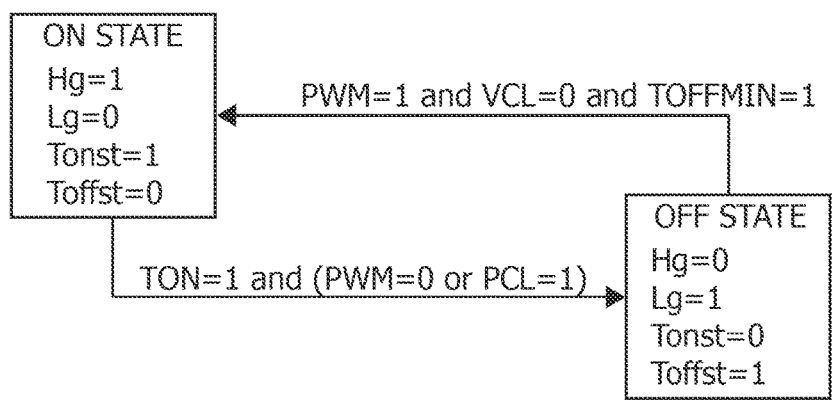
FIG. 4 is a block diagram exemplary of the behavior of a control logic circuit in embodiments as per the present description.

Just by way of recap, in one or more embodiments as exemplified in FIGS. 3 and 4, a controller (converter) 10 comprises a half-bridge power stage including a high-side (HS) electronic switch 121 and a low-side (LS) electronic switch 122 such as power mosfet transistors.

In one or more embodiments as exemplified in FIGS. 3 and 4:
  the current paths through 121 and 122 (source-drain current paths, in the case of field-effect transistors such as mosfet transistors) provide a first current flow line from an input voltage line or node Vin and a node A and a second current flow line between node A and ground GND with a voltage Vin applied across a first (input) capacitor C1 coupled between the input voltage line Vin and ground GND;
  the current paths through the transistors 121, 122 are coupled at the node A intermediate the transistors 121, 122 with an inductor L coupled between the node A and an output node B; and
  an output voltage Vout is provided at the node B across a second (output) capacitor C2 coupled between the output voltage node Vout (node B) and ground GND, with the inductor located intermediate the nodes A and B and a load LD suited to be coupled with the output node (here again, the load LD may be a distinct element from the embodiments).

In one or more embodiments as exemplified in FIGS. 3 and 4, switching of the switches 121 and 122 between an on-state (conductive) and an off-state (non-conductive) is controlled by a control logic circuit 16 coupled to the control terminals Hg, Lg (gates, in the case of field-effect transistors such as mosfet transistors) of the high-side and low-side switches 121, 122.

In one or more embodiments as exemplified in FIGS. 3 and 4, the control logic circuit 16 is sensitive to the output signal from the voltage comparator 181 which is configured to compare the output voltage Vout sensed at node B (namely across the output capacitor C2) with a voltage reference Vref (which may be obtained in different ways as discussed previously) thus acting as an output (PWM) comparator, whose output signal is asserted to a certain level ("1", for instance) as a result of the output voltage Vout being below Vref.

In one or more embodiments as exemplified in FIGS. 3 and 4, the control logic circuit 16 is also sensitive to the output signal from the current comparator 182, which is configured to compare the intensity of the current through the inductor L (as discussed previously, this may be sensed in different ways, for instance, at node A or at node B) with a current reference Ilim thus acting as a valley current limit (VCL) comparator whose output signal is asserted to a certain level ("1", for instance) as a result of the inductor current being higher than a valley (limit) reference value Ilim.

In one or more embodiments a converter 10 as exemplified in FIGS. 3 and 4 may include a (further) current comparator 183 configured to compare the intensity of the current through the inductor L with a peak current reference Ilimpk. The comparator 183 may thus act as a peak current limit (PCL) comparator whose output signal is asserted to a certain level ("1", for instance) as a result of the inductor current being higher than a (peak) reference value as expressed by Ilimpk.

As illustrated in FIG. 4, operation of the control logic circuit 16 of FIG. 3 in driving the control terminals (gates Hg and Lg, in the case of field-effect transistors such as mosfet transistors) of the high-side and low-side switches 121, 122 may again involve an OFF STATE and an ON STATE as discussed in connection with FIGS. 1 and 2.

In one or more embodiments as exemplified in FIGS. 3 and 4, the transition from the OFF STATE to the ON STATE (PWM=1 and VCL=0 and TOFFMIN=1) is essentially as already discussed in connection with FIG. 2.

That is, once the minimum off-time delay is asserted (TOFFMIN=1) by the circuit 20, if the current through the inductor L is lower than Ilim (VCL=0), the system waits for a PWM comparator trip (comparator 181). When the output voltage Vout falls below Vref, the PWM comparator 181 trips (PWM=1) and the system enters an ON STATE (see the transition again indicated as PWM=1 and VCL=0 and TOFFMIN=1 in FIG. 4).

Conversely, in one or more embodiments as exemplified in FIGS. 3 and 4, the logic circuit 16 may transition from the ON STATE to the OFF STATE as a result of:
  TON=1, that is the count of the on-timer 18 being completed (that is the count having reached its expiration value); and (that is, in combination with) either one of:
    PWM=0; or (alternatively)
    PCL=1.

Briefly, in one or more embodiments as exemplified in FIGS. 3 and 4, the logic circuit 16 may transition from the ON STATE to the OFF STATE as a result of:
  TON=1 and (PWM=0 or PCL=1).

In one or more embodiments as exemplified in FIGS. 3 and 4, the criteria of operation of the control logic circuit 16 may be as follows.

During the ON STATE, the on-time delay being completed (e.g., TON=1, that is the on-time count at 18 having reached its expiration value) is not enough to cause the system to transition to the OFF STATE.

In fact such a transition is conditioned on either one of PWM=0 or PCL=1.

According to the first condition expressed by the logic relationship captioned above, the transition from the ON STATE to the OFF STATE may occur if TON=1 (that is the on-time count at 18 having reached its expiration value) with the output voltage Vout having (already) reached the reference Vref (PWM=0).

This may be a situation occurring in a steady state, provided the duty cycle is not limited by the Ton/(Ton+Toffmin) ratio.

If the duty cycle is limited by that ratio, or during a transient load, as a result of on-time count at 18 having reached its expiration value (namely TON=1) while the output voltage Vout is (still) lower than Vref (that is PWM=1 from the comparator 181) the system does not transition to the OFF STATE and extends the time before the transition to the OFF STATE beyond the expiration of the on-time counter until the output voltage Vout reaches Vref, that is PWM=0.

As a second condition, in order to facilitate avoiding that the current through the inductor L should reach undesirably high values, the logic circuit 16 may be configured to exit the ON STATE and transition to the OFF STATE as a result of TON=1 (that is the on-time count at 18 having reached its expiration value) and the peak current limit comparator 183 detecting a current intensity through the inductor L which is higher than Ilimpk (that is PCL=1 from the comparator 183).

In either case, the system ends the on time and transition to the OFF STATE.

To sum up:

as in the case of a conventional converter as illustrated in FIGS. 1 and 2, the high-side switch 121 is switched on (made conductive) as a result of an indication from the PWM comparator 181 to the effect that the output voltage Vout is below the reference Vref (PWM=1), while also at the same time starting the internal on-time count; and in one or more embodiments as exemplified in FIGS. 3 and 4, the high-side switch 121 is switched off (made non-conductive) as a result of the internal timing having expired (timing finished TON=1)—and—the PWM comparator 181 indicating the output voltage Vout has reached the reference Vref (PWM=0). By way of simple explanation, in one or more embodiments as exemplified in FIGS. 3 and 4, the on-time count is "extended" beyond the value given by an internal timer (circuit 18) until the output voltage Vout is found having reached the reference Vref (PWM=0).

In one or more embodiments as exemplified in FIGS. 3 and 4, no upper bound is imposed on the duty cycle due to a minimum off-time.

This facilitates low drop-out operation while also improving inductor current slew rate during transients.

One or more embodiments as exemplified in FIGS. 3 and 4 may include a peak current sensing action at 183 so that the system may safely transition to the OFF STATE as a result of the current through the inductor L reaching a peak value Ilimpk (see the logic "or" in the transition PWM=0 or PCL=1 at the bottom of FIG. 4). The peak current comparator such as 183 is thus effective in limiting the inductor current during the on-time, thus co-operating with the conventional valley limitation of the current comparator 182.

Comparison of performance of embodiments as exemplified in FIGS. 3 and 4 with conventional solutions shows that, for instance with a 1 μs feedforward switching time Tsw (Tsw=Ton.(Vin/Vout)), and 250 ns (minimum) off time, a conventional solution may lose regulation when Vin=6.25 V, while embodiments as exemplified in FIGS. 3 and 4 may maintain adequate regulation down to Vin=5.1V Similarly, by referring to a transient load variation from 0 to 500 mA, Vin=7.2 V (two Li-Ion batteries) a conventional solution may be limited by a minimum off-time, while embodiments as exemplified in FIGS. 3 and 4 are essentially exempt from such a limitation.

A circuit (for instance, 10) as exemplified herein may comprise:

an input node (for instance, Vin) configured to receive an input voltage signal;

a half-bridge power circuit comprising a first switch (for instance, 121) having a current path therethrough providing a first current flow line between the input node (for instance, Vin) and a current node (for instance, A) and a second switch (for instance, 122) having a current path therethrough providing a second current flow line between the current node (for instance, A) and ground (for instance, GND);

an inductor (for instance, L) coupled between the current node and an output node (for instance, B), the output node configured to provide an output voltage signal (for instance, Vout); and a voltage comparator (for instance, 181) coupled to the output node and sensitive to said output voltage signal, the voltage comparator configured to assert a voltage indicator signal (for instance, PWM=1) as a result of said output voltage signal at said output node being lower than a voltage reference value (for instance, Vout<Vref=true).

For simplicity, the voltage comparator 181 is exemplified herein as a single component. In one or more embodiments, the voltage comparator can be implemented as a set of two components configured to compare Vout against substantially identical reference values for Vref for Vout increasing and decreasing, respectively. Similar considerations may apply also to the current comparators 182 and 183.

A circuit as exemplified herein (for instance, a DC-DC converter such as 10) may comprise:

an input node (for instance, Vin) configured to receive an input voltage signal;

a half-bridge (power) circuit comprising a first switch (for instance, 121) having a current path therethrough (for instance, a source-drain path in the case of a field-effect transistor such as mosfet transistor) providing a first current flow line between the input node and a current node (for instance, A) and a second switch (for instance, 122) having a current path therethrough (again, this may be a source-drain path in the case of a field-effect transistor such as mosfet transistor) providing a second current flow line between the current node and ground (for instance, GND);

an inductor (for instance, L) intermediate the current node and an output node (for instance, B), the output node configured to provide an output voltage signal (for instance, Vout);

a voltage comparator (for instance, 181) coupled to the output node and sensitive to said output voltage signal, the voltage comparator configured to assert a voltage indicator signal (for instance, PWM=1) as a result of said output voltage signal at said output node being lower than a voltage reference value (for instance, Vout<Vref=true); and logic circuitry (for instance, 16) configured to switch (for instance, via Hg, Lg) said first switch and said second switch to a current recirculation state (for instance, OFF STATE), wherein the first switch is non-conductive (for instance, Hg=0) and the second switch is conductive (for instance, Lg=1) with current through said inductor recirculated via said second current flow line, and to a current charge state (for instance, ON STATE), wherein the first switch is conductive (for instance, Hg=1) and the second switch is non-conductive (for instance, Lg=0) with current flowing in said inductor via said first current flow line, wherein said logic circuitry is configured to switch said first switch and said second switch:

from said current recirculation state to said current charge state as a result of said voltage indicator signal from the voltage comparator being asserted while starting (for instance, Tonst=1) an on-time counter signal having an expiration value—this is exemplified by the transition from the OFF STATE to the ON STATE illustrated in the upper portion of FIG. 4; and from said current charge state to said current recirculation state as a result of the count of said on-time counter signal having reached said expiration value (for instance, TON=1) in combination with—that is conditioned on, in logic "and" relationship—the voltage indicator signal from the voltage comparator being de-asserted (for instance, PWM=0)—this is exemplified by the transition from the ON STATE to the OFF STATE illustrated in the lower portion of FIG. 4 for TON=1—and —PWM=0).

A circuit as exemplified herein may advantageously comprise:

a peak current comparator (for instance, 183) coupled (for instance, at A) to said inductor and sensitive to the current through said inductor, the peak current comparator configured to assert a peak current indicator signal (for instance, PCL=1) as a result of the current intensity through said inductor reaching a peak reference value (for instance, inductor current>Ilimpk=true), wherein said logic circuitry may be configured to force switching of said first switch and said second switch from said current charge state to said current recirculation state as a result of the count of said on-time counter signal having reached said expiration value (for instance, TON=1) and said peak current indicator signal from the peak current comparator being asserted (for instance, PCL=1)—this is exemplified by the transition from the ON STATE to the OFF STATE illustrated in the lower portion of FIG. 4 for TON=1 and PCL=1 (note the "or" logic relationship linking PWM=0 with PCL=1).

Advantageously, in a circuit as exemplified herein, said logic circuitry may be configured to switch said first switch and said second switch from said current recirculation state to said current charge state as a result of said voltage indicator signal from the voltage comparator being asserted and the count of a lower off-time counter signal having reached a respective expiration value (for instance, TOFFMIN=1)—this is exemplified by the transition from the OFF STATE to the ON STATE illustrated in the upper portion of FIG. 4 for PWM=1 and TOFFMIN=1 (note the "and" logic relationship linking PWM=1 and TOFFMIN=1).

A circuit as exemplified herein may advantageously comprise a valley current comparator (for instance, 182) coupled (for instance, at A) to said inductor and sensitive to the current through said inductor, the valley current comparator configured to assert a valley current indicator signal (for instance, VCL=0) as a result of the current intensity through said inductor being lower than a valley current reference value (for instance, Ilim—inductor current<Ilim=true), wherein said logic circuitry may be configured to switch said first switch and said second switch from said current recirculation state to said current charge state as a result of said voltage indicator signal from the voltage comparator and said valley current indicator signal from the valley current comparator being jointly asserted (PWM=1; VCL=0)—this is exemplified by the transition from the OFF STATE to the ON STATE illustrated in the upper portion of FIG. 4 for PWM=1 and VLC=0 (note the "and" logic relationship linking PWM=1 and VLC=0).

Advantageously, in a circuit as exemplified herein, said logic circuitry may be configured to switch said first switch and said second switch from said current recirculation state to said current charge state as a result of said voltage indicator signal from the voltage comparator and said valley current indicator signal from the valley current comparator being jointly asserted and the count of said lower off-time counter signal having reached a respective expiration value—this is exemplified by the transition from the OFF STATE to the ON STATE illustrated in the upper portion of FIG. 4 for PWM=1 and VLC=0 and TOFFMIN=1 (note the "and" logic relationship linking PWM=1, VLC=0 and VLC=0).

A circuit as exemplified herein may advantageously comprise an on-time timer circuit (for instance, 18) configured to provide said on-time counter signal with an expiration value which is a function of the ratio of said output voltage signal at said output node and said input voltage signal at said input node (for instance, Ton=(Vout/Vin)·R·C).

A device as exemplified herein (for instance, this may be any of the devices mentioned in the introductory part of this description) may comprise:

a circuit as exemplified herein (for instance, 10); and a load (for instance, LD) coupled to said output node (for instance, B) of said circuit to receive therefrom said output voltage signal (for instance, Vout).

As method as exemplified herein involves operating a circuit comprising:

an input node configured to receive an input voltage signal;

a half-bridge circuit comprising a first switch having a current path therethrough providing a first current flow line between the input node and a current node and a second switch having a current path therethrough providing a second current flow line between the current node and ground); and an inductor intermediate the current node and an output node, the output node configured to provide an output voltage signal.

A method as exemplified herein may comprise:

sensing (for instance, at 181) said output voltage signal and asserting a voltage indicator signal as a result of said output voltage signal at said output node being lower than a voltage reference value;

switching said first switch and said second switch to a current recirculation state (for instance, OFF STATE), wherein the first switch is non-conductive and the second switch is conductive with current through said inductor recirculated via said second current flow line, and to a current charge state (for instance, ON STATE), wherein the first switch is conductive and the second switch is non-conductive with current flowing in said inductor via said first current flow line; and switching said first switch and said second switch:
from said current recirculation state to said current charge state as a result of said voltage indicator signal from the voltage comparator being asserted while starting an on-time counter signal having an expiration value; and from said current charge state to said current recirculation state as a result of the count of said on-time counter signal having reached said expiration value in combination with the voltage indicator signal from the voltage comparator being de-asserted.

A method as exemplified herein may advantageously comprise:

sensing (for instance, at 183) the current through said inductor and asserting a peak current indicator signal as a result of the current intensity through said inductor reaching a peak reference value; and forcing switching of said first switch and said second switch from said current charge state to said current recirculation state as a result of the count of said on-time counter signal having reached said expiration value and said peak current indicator signal from the peak current comparator being asserted.

Without prejudice to the underlying principles, the details and embodiments may vary, even significantly, with respect to what has been described by way of example only, without departing from the extent of protection.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A circuit, comprising:
an input node configured to receive an input voltage signal;
a half-bridge circuit including a first switch configured to provide a first current path between the input node and a current node and a second switch configured to provide a second current path between the current node and ground;
an inductor coupled between the current node and an output node, the output node configured to provide an output voltage signal;
a voltage comparator coupled to the output node and sensitive to the output voltage signal, the voltage comparator configured to assert a voltage indicator signal in response to the output voltage signal at the output node being lower than a voltage reference value; and
logic circuitry configured to switch the first switch and the second switch to a current recirculation state, wherein the first switch is non-conductive and the second switch is conductive with current through the inductor recirculated via the second current path, and to a current charge state, wherein the first switch is conductive and the second switch is non-conductive with current flowing in the inductor via the first current path,
wherein the logic circuitry is configured to switch the first switch and the second switch:
from the current recirculation state to the current charge state in response to the voltage indicator signal from the voltage comparator being asserted while starting an on-time counter signal having an expiration value,
from the current recirculation state to the current charge state in response to the voltage indicator signal from the voltage comparator being asserted and a count of a lower off-time counter signal having reached a respective expiration value, and
from the current charge state to the current recirculation state in response to a count of the on-time counter signal having reached the expiration value in combination with the voltage indicator signal from the voltage comparator being de-asserted.

2. The circuit of claim 1, comprising:
a peak current comparator coupled to the inductor and sensitive to the current through the inductor, the peak current comparator configured to assert a peak current indicator signal in response to a current intensity through the inductor reaching a peak reference value,
wherein the logic circuitry is configured to force switching of the first switch and the second switch from the current charge state to the current recirculation state in response to the count of the on-time counter signal having reached the expiration value and the peak current indicator signal from the peak current comparator being asserted.

3. The circuit of claim 1, comprising a valley current comparator coupled to the inductor and sensitive to the current through the inductor, the valley current comparator configured to assert a valley current indicator signal in response to a current intensity through the inductor being lower than a valley current reference value, wherein the logic circuitry is configured to switch the first switch and the second switch from the current recirculation state to the current charge state in response to the voltage indicator signal from the voltage comparator and the valley current indicator signal from the valley current comparator being jointly asserted.

4. The circuit of claim 1, comprising a valley current comparator coupled to the inductor and sensitive to the current through the inductor, the valley current comparator configured to assert a valley current indicator signal in response to a current intensity through the inductor being lower than a valley current reference value, wherein the logic circuitry is configured to switch the first switch and the second switch from the current recirculation state to the current charge state in response to the voltage indicator signal from the voltage comparator and the valley current indicator signal from the valley current comparator being jointly asserted.

5. The circuit of claim 4, wherein the logic circuitry is configured to switch the first switch and the second switch from the current recirculation state to the current charge state in response to the voltage indicator signal from the voltage comparator and the valley current indicator signal from the valley current comparator being jointly asserted and the count of the lower off-time counter signal having reached a respective expiration value.

6. The circuit of claim 4, wherein the inductor has a first terminal electrically connected to an input of the valley current comparator and a second terminal electrically connected to the output node.

7. The circuit of claim 1, comprising an on-time timer circuit configured to provide the on-time counter signal with the expiration value which is a function of a ratio of the output voltage signal at the output node and the input voltage signal at the input node.

8. A device, comprising:
a circuit, including:
an input node configured to receive an input voltage signal;
a half-bridge circuit including a first switch configured to provide a first current path between the input node and a current node and a second switch configured to provide a second current path between the current node and ground;
an inductor coupled between the current node and an output node, the output node configured to provide an output voltage signal;
a voltage comparator coupled to the output node and sensitive to the output voltage signal, the voltage comparator configured to assert a voltage indicator signal in response to the output voltage signal at the output node being lower than a voltage reference value;
a valley current comparator coupled to the inductor and sensitive to the current through the inductor, the valley current comparator configured to assert a valley current indicator signal in response to a current intensity through the inductor being lower than a valley current reference value; and
logic circuitry configured to switch the first switch and the second switch to a current recirculation state, wherein the first switch is non-conductive and the second switch is conductive with current through the inductor recirculated via the second current path, and to a current charge state, wherein the first switch is conductive and the second switch is non-conductive with current flowing in the inductor via the first current path,
wherein the logic circuitry is configured to switch the first switch and the second switch:
from the current recirculation state to the current charge state in response to the voltage indicator signal from the voltage comparator being asserted while starting an on-time counter signal having an expiration value,
from the current recirculation state to the current charge state in response to the voltage indicator signal from the voltage comparator and the valley current indicator signal from the valley current comparator being jointly asserted, and
from the current charge state to the current recirculation state in response to a count of the on-time counter signal having reached the expiration value in combination with the voltage indicator signal from the voltage comparator being de-asserted; and
a load coupled to the output node of the circuit and configured to receive the output voltage signal.

9. The device of claim 8, wherein the circuit includes:
a peak current comparator coupled to the inductor and sensitive to the current through the inductor, the peak current comparator configured to assert a peak current indicator signal in response to a current intensity through the inductor reaching a peak reference value, wherein the logic circuitry is configured to force switching of the first switch and the second switch from the current charge state to the current recirculation state in response to the count of the on-time counter signal having reached the expiration value and the peak current indicator signal from the peak current comparator being asserted.

10. The device of claim 8, wherein the logic circuitry is configured to switch the first switch and the second switch from the current recirculation state to the current charge state in response to the voltage indicator signal from the voltage comparator being asserted and a count of a lower off-time counter signal having reached a respective expiration value.

11. The device of claim 10, wherein the circuit includes the valley current comparator coupled to the inductor and sensitive to the current through the inductor, the valley current comparator configured to assert the valley current indicator signal in response to the current intensity through the inductor being lower than the valley current reference value, wherein the logic circuitry is configured to switch the first switch and the second switch from the current recirculation state to the current charge state in response to the voltage indicator signal from the voltage comparator and the valley current indicator signal from the valley current comparator being jointly asserted.

12. The device of claim 11, wherein the logic circuitry is configured to switch the first switch and the second switch from the current recirculation state to the current charge state in response to the voltage indicator signal from the voltage comparator and the valley current indicator signal from the valley current comparator being jointly asserted and the count of the lower off-time counter signal having reached a respective expiration value.

13. The device of claim 11, wherein the inductor has a first terminal electrically connected to an input of the valley current comparator and a second terminal electrically connected to the output node.

14. The device of claim 8, wherein the circuit includes an on-time timer circuit configured to provide the on-time counter signal with the expiration value which is a function of a ratio of the output voltage signal at the output node and the input voltage signal at the input node.

15. A method of operating a circuit, the circuit including:
an input node configured to receive an input voltage signal;
a half-bridge circuit comprising a first switch configured to provide a first current path between the input node and a current node and a second switch configured to provide a second current path between the current node and ground; and
an inductor coupled between the current node and an output node, the output node configured to provide an output voltage signal;
the method, comprising:
sensing the output voltage signal and asserting a voltage indicator signal in response to the output voltage signal at the output node being lower than a voltage reference value;
switching the first switch and the second switch to a current recirculation state, wherein the first switch is non-conductive and the second switch is conductive with current through the inductor recirculated via the second current path, and to a current charge state, wherein the first switch is conductive and the second switch is non-conductive with current flowing in the inductor via the first current path; and
switching the first switch and the second switch:
from the current recirculation state to the current charge state in response to the voltage indicator signal from a voltage comparator being asserted while starting an on-time counter signal having an expiration value;

from the current recirculation state to the current charge state in response to the voltage indicator signal from the voltage comparator being asserted and a count of a lower off-time counter signal having reached a respective expiration value; and from the current charge state to the current recirculation state in response to the on-time counter signal having reached the expiration value in combination with the voltage indicator signal from the voltage comparator being de-asserted.

16. The method of claim 15, comprising:

sensing the current through the inductor and asserting a peak current indicator signal in response to a current intensity through the inductor reaching a peak reference value; and forcing switching of the first switch and the second switch from the current charge state to the current recirculation state in response to the count of the on-time counter signal having reached the expiration value and the peak current indicator signal from a peak current comparator being asserted.

17. The method of claim 15, comprising:

asserting, by a valley current comparator coupled to the inductor, a valley current indicator signal in response to a current intensity through the inductor being lower than a valley current reference value, wherein switching the first switch and the second switch from the current recirculation state to the current charge state includes switching the first switch and the second switch in response to the voltage indicator signal from the voltage comparator and the valley current indicator signal from the valley current comparator being jointly asserted.

18. The method of claim 15, comprising switching the first switch and the second switch from the current recirculation state to the current charge state in response to the voltage indicator signal from the voltage comparator and a valley current indicator signal from a valley current comparator being jointly asserted and the count of the lower off-time counter signal having reached a respective expiration value.

19. The method of claim 15, wherein the inductor has a first terminal electrically connected to an input of a valley current comparator and a second terminal electrically connected to the output node.

20. The method of claim 15, comprising providing the on-time counter signal with the expiration value which is a function of a ratio of the output voltage signal at the output node and the input voltage signal at the input node.

* * * * *